United States Patent
Han et al.

(10) Patent No.: US 11,459,728 B2
(45) Date of Patent: Oct. 4, 2022

(54) APPARATUS AND METHOD FOR CONTROLLING REMOTE-CONTROLLED EXCAVATOR FOR PREVENTING OVERLOAD

(71) Applicant: INDUSTRY-UNIVERSITY COOPERATION FOUNDATION HANYANG UNIVERSITY ERICA CAMPUS, Ansan-si (KR)

(72) Inventors: Chang Soo Han, Seoul (KR); Sang Ho Kim, Ansan-si (KR); Yong Seok Lee, Ansan-si (KR); Dong Ik Sun, Ansan-si (KR); Sang Keun Lee, Ansan-si (KR)

(73) Assignee: INDUSTRY-UNIVERSITY COOPERATION FOUNDATION HANYANG UNIVERSITY ERICA CAMPUS

( * ) Notice: Subject to any disclaimer, the term of this patent is extended or adjusted under 35 U.S.C. 154(b) by 0 days.

(21) Appl. No.: 17/417,931

(22) PCT Filed: Nov. 11, 2019

(86) PCT No.: PCT/KR2019/015216
§ 371 (c)(1),
(2) Date: Jul. 30, 2021

(87) PCT Pub. No.: WO2020/138708
PCT Pub. Date: Jul. 2, 2020

(65) Prior Publication Data
US 2022/0081875 A1    Mar. 17, 2022

(30) Foreign Application Priority Data
Dec. 27, 2018 (KR) .................. 10-2018-0171362

(51) Int. Cl.
*E02F 9/20* (2006.01)
*E02F 9/24* (2006.01)
(Continued)

(52) U.S. Cl.
CPC ................ *E02F 9/205* (2013.01); *E02F 9/24* (2013.01); *G05D 3/125* (2013.01); *G05D 3/20* (2013.01)

(58) Field of Classification Search
CPC . E02F 9/205; E02F 9/24; G05D 3/125; G05D 3/20
See application file for complete search history.

(56) References Cited

U.S. PATENT DOCUMENTS 9,587,369 B2 *  3/2017  Fletcher .................. E02F 3/841
9,926,677 B1 *  3/2018  Beckhusen ............. E02F 3/967
(Continued)

FOREIGN PATENT DOCUMENTS

| JP | 03-025125 A | 2/1991 |
| JP | 2016-045674 A | 4/2016 |

(Continued)

*Primary Examiner* — Daniel L Greene
(74) *Attorney, Agent, or Firm* — Novick, Kim & Lee, PLLC; Jae Youn Kim (57) ABSTRACT

Disclosed are an apparatus and method for controlling a remote-controlled excavator for preventing overload. The apparatus for controlling a remote-controlled excavator according to an embodiment of the present invention comprises: inertial sensors provided in the excavator; a communication unit for receiving a remote control signal from a remote control apparatus; and a control unit for driving the excavator in response to the remote control signal, wherein the control unit stops driving the excavator when a difference between an expected posture of the excavator estimated on the basis of the remote control signal and an actual
(Continued)

posture of the excavator measured by using the inertial sensors exceeds an allowable value.

9 Claims, 5 Drawing Sheets

(51) Int. Cl.
  *G05D 3/12* (2006.01)
  *G05D 3/20* (2006.01)

(56) References Cited

U.S. PATENT DOCUMENTS

| | | | |
|---|---|---|---|
| 2009/0139119 A1* | 6/2009 | Janardhan | G01G 19/021 37/413 |
| 2009/0143896 A1* | 6/2009 | Janardhan | E02F 9/264 37/413 |
| 2013/0229272 A1* | 9/2013 | Elliott | G05G 9/047 74/471 XY |
| 2014/0121840 A1* | 5/2014 | Mizuochi | E02F 9/265 700/275 |
| 2017/0147958 A1* | 5/2017 | Hatfield | G06Q 10/063114 |
| 2019/0010675 A1* | 1/2019 | Ogawa | G01B 7/16 |
| 2019/0017248 A1* | 1/2019 | Okada | E02F 3/435 |
| 2019/0345697 A1* | 11/2019 | Ishihara | E02F 3/43 |
| 2020/0074383 A1* | 3/2020 | Smith | G06Q 10/063114 |
| 2021/0079625 A1* | 3/2021 | Narikawa | E02F 9/2296 |
| 2021/0148082 A1* | 5/2021 | Suzuki | E02F 9/2267 |

FOREIGN PATENT DOCUMENTS

| | | | | |
|---|---|---|---|---|
| JP | 2017-022433 A | 1/2017 | | |
| KR | 10-2010-0127963 A | 12/2010 | | |
| KR | 10-1776819 B1 | 9/2017 | | |
| WO | WO-2009087795 A1 * | 7/2009 | | E02F 3/302 |
| WO | WO-2011143301 A1 * | 11/2011 | | F15B 11/163 |

* cited by examiner

APPARATUS AND METHOD FOR CONTROLLING REMOTE-CONTROLLED EXCAVATOR FOR PREVENTING OVERLOAD

TECHNICAL FIELD

The present invention relates to an apparatus and a method for controlling a remote-controlled excavator, and more particularly, to an excavator remote control apparatus and an excavator remote control method for preventing overloading.

BACKGROUND ART

Excavators are construction machines that perform work, such as excavation work to dig the ground, loading work to transport soil, shredding work to dismantle buildings, and soil preparation to clean the ground at a construction site in civil engineering and construction, and includes a traveling body that moves the excavator, an upper swivel body that is mounted on the traveling body and rotates 360°, and a working device.

The excavators are divided into caterpillar-type crawler excavators and tire-type wheel excavators according to a traveling method of the excavator. Since the crawler excavator has stable operation and higher work productivity than the wheel excavator, the crawler excavator is widely used at each work site. Meanwhile, compared to the crawler excavator, the wheel excavator has lower stability during operation due to a tire support method. However, the wheel excavator can travel on a road and can move with a transport trailer, and thus, is mainly used for worksites that require frequent work and movement.

In addition, the excavator may be used by attaching an appropriate working device (attachment) according to a condition of soil and rock and type of work and usage. A bucket for general excavation and soil transport, a breaker for crushing hard ground and rocks, a crusher for dismantling and crushing buildings, and the like are the working devices mainly used in the excavator.

Recently, a method of remotely controlling an excavator for work in an area that is difficult or dangerous for a person to enter is studied. The conventional remote-controlled excavator requires a considerable amount of time for the entire process, such as manipulating of a manipulator, transmitting of a manipulation signal, driving of the excavator, and feedback regarding an excavator state, and thus, malfunction or failure of the excavator may occur due to overload caused by unexpected obstacles.

DISCLOSURE

Technical Problem

The present invention is directed to providing an apparatus and a method for controlling a remote-controlled excavator capable of preventing overload.

Technical Solution

One aspect of the present invention provides an apparatus for controlling a remote-controlled excavator including inertial sensors provided in an excavator, a communication unit configured to receive a remote control signal from a remote control device, and a control unit configured to drive the excavator in response to the remote control signal, in which the control unit stops driving of the excavator when a difference between an expected posture of the excavator estimated based on the remote control signal and an actual posture of the excavator measured using the inertial sensors exceeds an allowable value.

The inertial sensors may include a first inertial sensor provided in a main body of the excavator, a second inertial sensor provided in a boom of the excavator, a third inertial sensor provided in an arm of the excavator, and a fourth inertial sensor provided in an attachment of the excavator.

The attachment may include a bucket, a breaker, a vibrator, a fork, a crusher, or a grapple.

When the difference between the expected posture and the actual posture exceeds the allowable value, the communication unit may transmit an overload occurrence signal to the remote control device.

The control unit may include a drive unit configured to output a drive signal to the excavator in response to the remote control signal, a memory configured to store a current posture of the excavator, a posture estimation unit configured to estimate the expected posture based on the current posture and a posture change value corresponding to the remote control signal, a posture measurement unit configured to measure the actual posture based on sensing values, and an overload detection unit configured to output a drive stop signal to the drive unit when the difference between the expected posture and the actual posture exceeds the allowable value, in which the drive unit may block the drive signal in response to the drive stop signal.

The control unit may include a drive unit configured to output a drive signal to the excavator in response to the remote control signal, a posture change amount measurement unit configured to measure an actual posture change amount of the excavator based on sensing values received from the inertial sensors, a posture change amount estimation unit configured to calculate an expected posture change amount corresponding to the remote control signal, and an overload detection unit configured to output a drive stop signal to the drive unit when a difference between the actual posture change amount and the expected posture change amount exceeds the allowable value while the excavator is driven, in which the drive unit may block the drive signal in response to the drive stop signal.

The control apparatus may further include a pressure sensor provided in an attachment of the excavator, in which the control unit may adjust the allowable value according to a magnitude of a reaction force measured by the pressure sensor.

The control unit may increase the allowable value according to the number of times the difference between the expected posture and the actual posture exceeds the allowable value.

The communication unit may transmit the actual posture of the excavator to the remote control device.

Another aspect of the present invention provides a method for controlling a remote-controlled excavator including measuring a current posture of an excavator, estimating an expected posture by adding a posture change value corresponding to a control signal received from a remote control device to a current posture, driving the excavator in response to the control signal and measuring an actual posture of the excavator, and stopping driving of the excavator when a difference between the expected posture and the actual posture exceeds an allowable value.

The method may further include updating the current posture using the actual posture.

The method may further include measuring a reaction force applied to an attachment of the excavator and adjusting the allowable value according to a magnitude of the reaction force.

The method may further include increasing the allowable value when the difference between the expected posture and the actual posture exceeds the allowable value.

The method may further include transmitting an overload signal to the remote control device when the difference between the expected posture and the actual posture exceeds the allowable value.

Advantageous Effects

In an apparatus and a method for controlling a remote-controlled excavator according to an exemplary embodiment of the present invention, the remote-controlled excavator detects overload by itself and stops driving, and thus, it is possible to prevent malfunctioning or failure of the excavator even when a communication delay occurs between a remote control device and the excavator.

DESCRIPTION OF DRAWINGS

A detailed description of each drawing is provided in order to more fully understand the drawings in a detailed description of the present invention.

MODES OF THE INVENTION

Specific structural or functional descriptions for embodiments according to a concept of the present invention disclosed in the present specification are only exemplified for the purpose of describing the embodiments according to the concept of the present invention, and the embodiments according to the concept of the present invention may be embodied in various forms and are not limited to the embodiments described herein.

Since the embodiments according to the concept of the present invention may have various changes and may have various forms, the embodiments will be illustrated in the drawings and described in detail herein. However, this is not intended to limit the embodiments according to the concept of the present invention to specific disclosed forms and includes all modifications, equivalents, or substitutes included in the spirit and scope of the present invention.

A term such as a first or second may be used to describe various components, but the components should not be limited by the terms. The above terms are used only for the purpose of distinguishing one component from another component, and for example, without departing from the scope of the present invention, a first component may be referred to as a second component, and similarly, the second component may also be referred to as the first component.

When a component is referred to as being "coupled" or "connected" to another component, it should be understood that the other component may be directly coupled or connected to another component, but other components may be present therebetween. On the other hand, when a component is referred to as being "directly coupled" or "directly connected" to another component, it should be understood that still another element is not present therebetween. Other expressions describing a relationship between components, such as "between" and "immediately between" or "neighboring to" and "directly adjacent to", or the like should be interpreted similarly.

The terms used herein are used only to describe specific embodiments and are not intended to limit the present invention. A singular expression includes plural expressions unless a context clearly dictates otherwise. In the present specification, it should be understood that a term such as "include" or "have" is intended to designate that an embodied feature, number, step, operation, component, part, or combination thereof exists and does not preclude a possibility of addition or existence of one or more other features, numbers, steps, operations, components, parts or combinations thereof.

Unless otherwise defined, all terms used herein, including technical or scientific terms, have the same meaning as commonly understood by one of ordinary skill in the art to which the present invention belongs. Terms such as those defined in a commonly used dictionary should be interpreted as having a meaning consistent with the meaning in the context of the related art and should not be interpreted with an ideal or excessively formal meaning unless explicitly defined in the present specification.

Hereinafter, the present invention will be described in detail by describing exemplary embodiments of the present invention with reference to the accompanying drawings.

Figure 1:
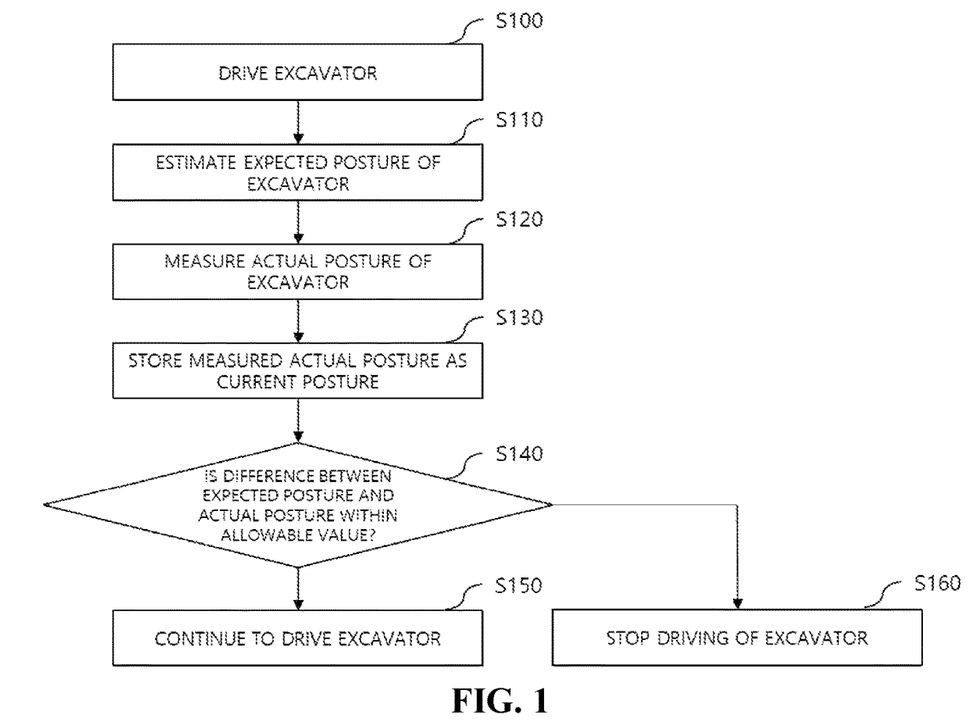
FIG. 1 is a flowchart for describing a method for controlling a remote-controlled excavator according to one embodiment of the present invention.
Figure 2:
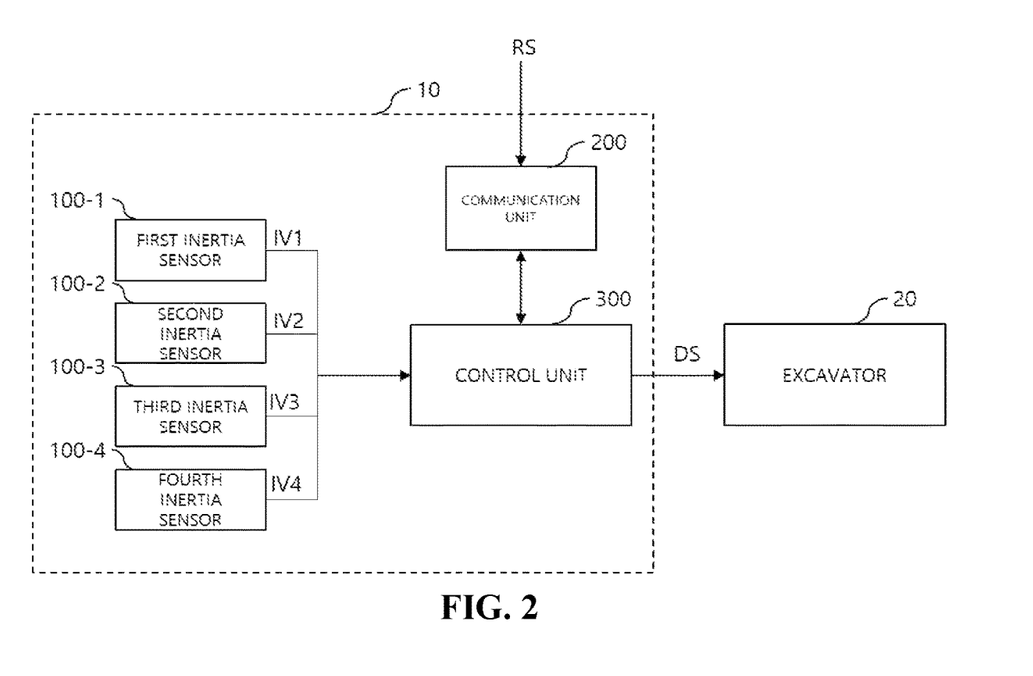
FIG. 2 is a block diagram illustrating an apparatus for controlling a remote-controlled excavator according to a first embodiment of the present invention.
Figure 3:
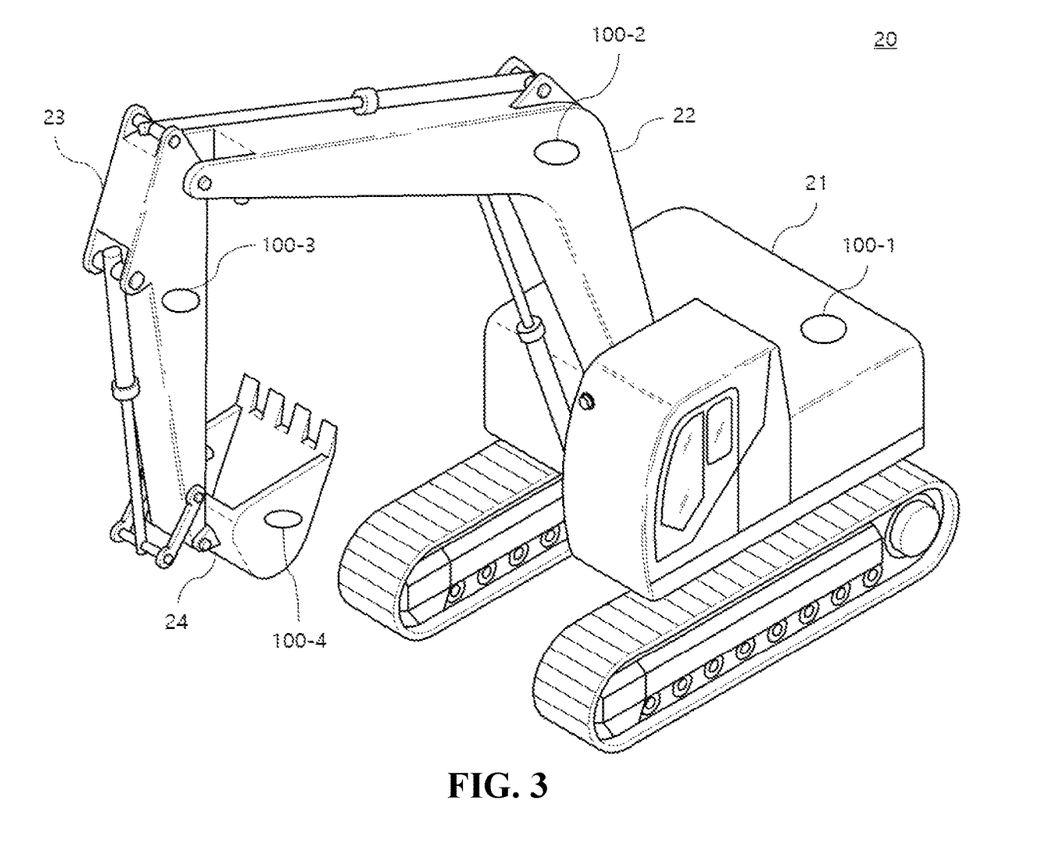
FIG. 3 is a perspective view illustrating an excavator according to one embodiment of the present invention.

FIG. 1 is a flowchart for describing a method for controlling a remote-controlled excavator according to one embodiment of the present invention, FIG. 2 is a block diagram illustrating an apparatus for controlling a remote-controlled excavator according to a first embodiment of the present invention, and FIG. 3 is a perspective view illustrating an excavator according to one embodiment of the present invention.

Referring to FIGS. 1 to 3, a control apparatus 10 of a remote-controlled excavator 20 (hereinafter referred to as an "excavator") includes inertial sensors 100-1 to 100-4, a communication unit 200 and a control unit 300. The control apparatus 10 may be provided in a main body of the remote-controlled excavator 20.

The inertial sensors 100-1 to 100-4 measure inertial forces on parts (for example, main body, boom, arm, and attachment) of the excavator 20 and transmit the measured inertial sensing values IV1 to IV4 to the control unit 300. The inertial sensors 100-1 to 100-4 are provided in the excavator 20. For example, as illustrated in FIG. 3, a first inertial sensor 100-1 may be provided in a main body 21 of the excavator 20, a second inertial sensor 100-2 may be provided in a boom 21 of the excavator 20, a third inertial sensor 100-3 may be provided in an arm 23 of the excavator 20, and a fourth inertial sensor 100-4 may be provided in an attachment 24 of the excavator 20.

In FIG. 3, the attachment 24 is illustrated as a bucket, but this is only an example. For example, the attachment 24 may include not only a bucket, but also various work tools such as a breaker, vibrator, fork, crusher, or grapple.

The communication unit 200 communicates with a remote control device (not illustrated). The communication unit 200 may receive a remote control signal RS from the remote control device (not illustrated) and transmit the remote control signal RS to the control unit 300. The communication unit 200 may receive current state information, an overload detection signal, or the like of the excavator 20 from the control unit 300 and transmit the information, signal, or the like to the remote control device (not illustrated).

The control unit 300 drives the excavator 20 in response to the remote control signal RS received through the communication unit 200 from the remote control device (not illustrated). When a difference between an ideal (that is, in a normal state) movement and an actual movement of the excavator 20 is out of an allowable range, the control unit 300 determines that an overload has occur in the excavator 20 and stops driving of the excavator 20.

More specifically described with reference to FIG. 1, in an initial setting step, the control unit 300 sets the excavator 20 to a predetermined initial posture (S100). The control unit 300 uses the inertial sensors 100-1 to 100-4 provided in the excavator 20 to measure the posture of the remote-controlled excavator 20, that is, positions or angles of the main body, boom, arm, and attachment (attachment). The control unit 300 may accurately store a current posture of the excavator 20 by continuously monitoring the excavator 20 from the initial state (posture) through the inertial sensors 100-1 to 100-4.

The control unit 300 receives the remote control signal RS from the remote control device (not illustrated) through the communication unit 200 and drives the excavator 20 in response to the received remote control signal RS (S110). The control unit 300 converts the remote control signal RS into a drive signal DS suitable for the excavator 20 and outputs the drive signal DS to the excavator 20.

According to one embodiment, when the excavator 20 is an electro-hydraulic type excavator, the control apparatus 10 may output the drive signal DS to an electro-hydraulic control unit of the excavator 20. According to another embodiment, when a remote control robot is attached to the excavator 20, the control apparatus 10 may output the drive signal DS to the remote control robot.

The control unit 300 estimates an expected posture of the excavator 20 based on the remote control signal RS (S120). The control unit 300 estimates the expected posture by adding a posture change value corresponding to the remote control signal RS to the current posture of the excavator 20. The posture change value corresponding to the remote control signal RS may be determined according to a working environment (temperature, humidity, or the like) and a type and current state of the excavator (20).

The control unit 300 measures an actual posture of the excavator 20 based on the inertial sensing values IV1 to IV4 output from the inertial sensors 100-1 to 100-4 (S130). As described above, the control unit 300 may measure the actual posture of the excavator 20 accurately by continuously monitoring the excavator 20 from the initial state.

The control unit 300 stores the measured actual posture of the excavator 20 as the current posture (S140).

The control unit 300 compares the estimated expected posture and the measured actual posture (S150).

When a difference between the estimated expected posture and the measured actual posture is within the allowable value (YES in S150), the control unit 300 continues to drive the excavator 20 (S160).

Conversely, when the difference between the estimated expected posture and the measured actual posture exceeds the allowable value (NO in S150), the control unit 300 stops driving of the excavator 20 (S170).

Here, the allowable value may be determined according to the working environment (temperature, humidity, etc.), the type and current state of the excavator 20, or the like.

According to an embodiment, when the difference between the expected posture and the actual posture exceeds the allowable value, the control unit 300 may increase the allowable value. Through this, the control unit 300 can drive the excavator 20 in spite of the overload when it is specifically necessary.

A function and operation of the control unit 300 will be described in more detail with reference to FIGS. 4 and 5.

Figure 4:
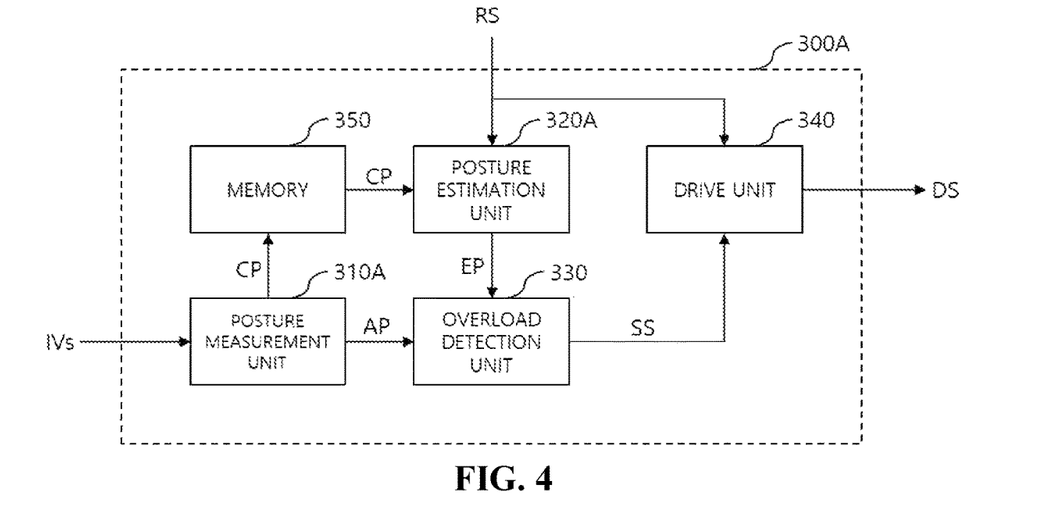
FIG. 4 is a block diagram illustrating an example of a control unit illustrated in FIG. 2.

FIG. 4 is a block diagram illustrating an example of the control unit illustrated in FIG. 2. Referring to FIG. 4, the control unit 300A includes a posture measurement unit 310A, a posture estimation unit 320A, an overload detection unit 330, a drive unit 340, and a memory 350.

The posture measurement unit 310A receives the inertial sensing values IV1 to IV4 (hereinafter, referred to as IVs) from the inertial sensors 100-1 to 100-4 and measures the actual posture of the excavator based on the received inertia sensing values IVs. The posture measurement unit 310A outputs actual posture information AP on the measured actual posture to the overload detection unit 330. In addition, the posture measurement unit 310A stores the actual posture information AP in the memory 350 as current posture information CP.

Here, the actual posture information AP, the current posture information CP, and expected posture information EP include values regarding positions and angles of the main body 21, the boom 22, the arm 23, and the attachment 24 of the excavator 20. Comparing the posture information may be interpreted as comparing values included in the posture information.

The posture estimation unit 320A calculates the posture change value corresponding to the remote control signal RS. Specifically, the remote control signal RS includes commands for controlling the main body 21, the boom 22, the arm 23, and the attachment 24 of the excavator 20, and thus, the posture estimation unit 320A calculates the posture change values of the main body 21, the boom 22, the arm 23, and the attachment 24 corresponding to the commands.

The posture estimation unit 320A retrieves the current posture information CP from the memory 350 and estimates the expected posture of the excavator 20 by applying the calculated posture change value. That is, the posture estimation unit 320A generates the expected posture information EP by adding the calculated posture change value to the current posture information CP. The posture estimation unit 320A outputs the generated expected posture information EP to the overload detection unit 330.

The overload detection unit 330 receives the actual posture information AP from the posture measurement unit 310A and receives the expected posture information EP from the posture estimation unit 320A. The overload detection unit 330 detects whether or not the overload occurs based on the actual posture information AP and expected posture information EP.

The overload detection unit 330 determines that the overload has not occurred when the difference between the actual posture information AP and the expected posture information EP is within the allowable range. Conversely, the overload detection unit 330 determines that the overload has occurred when the difference between the actual posture information AP and the expected posture information EP exceeds the allowable range.

For example, when an actually measured angle of the boom 22 and an expected angle of the boom 22 exceed the allowable range, the overload detection unit 330 determines that overload has occurred in the excavator 20.

When it is determined that the overload has occurred, the overload detection unit 330 outputs a drive stop signal SS to the drive unit 340.

The drive unit 340 drives the excavator 20 in response to a remote control signal RS. The drive unit 340 converts the remote control signal RS into a drive signal DS suitable for driving the excavator 20 and outputs the drive signal DS to the excavator 20.

The drive unit 340 blocks the drive signal DS in response to the drive stop signal SS received from the overload detection unit 330.

The memory 350 stores the current posture information CP received from the posture measurement unit 310A. The memory 350 outputs the stored current posture information CP to the posture estimation unit 320A in response to a request from the posture estimation unit 320A.

Figure 5:
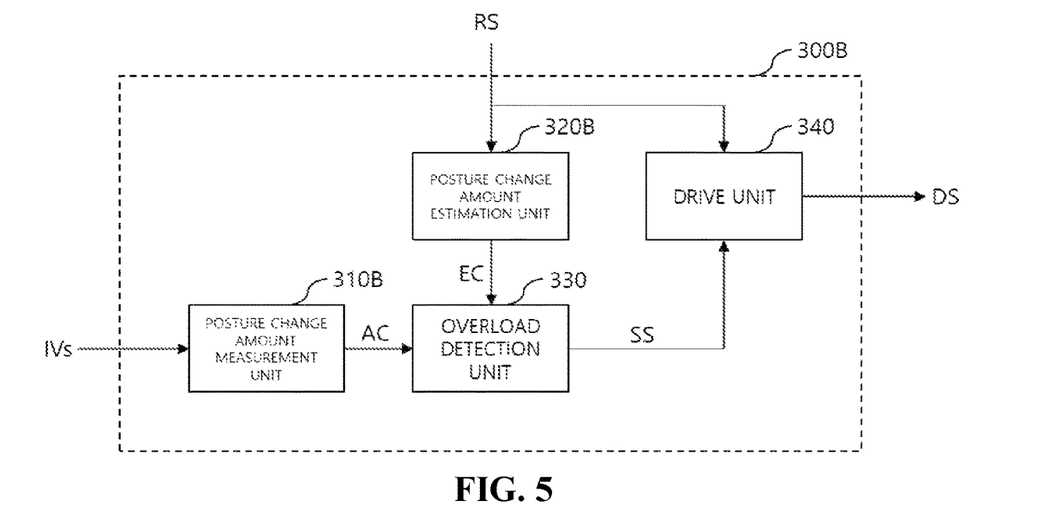
FIG. 5 is a block diagram illustrating another example of the control unit illustrated in FIG. 2.

FIG. 5 is a block diagram illustrating another example of the control unit illustrated in FIG. 2. FIG. 5 illustrates a control unit 300B capable of determining whether or not overload occurs based on an amount of posture change regardless of the current posture.

Referring to FIG. 5, the control unit 300B includes a posture change amount measurement unit 310B, a posture change amount estimation unit 320B, an overload detection unit 330, and a drive unit 340.

The posture change amount measurement unit 310B measures the amount of posture change for a certain time of the excavator based on the inertia sensing values IVs. The posture change amount measurement unit 310B outputs the actual posture change amount information AC for the measured amount of posture change to the overload detection unit 330.

The posture change amount estimation unit 320B calculates the expected posture change amount corresponding to the remote control signal RS. Specifically, the posture change amount estimation unit 320B calculates the expected posture change amount of the main body 21, the boom 22, the arm 23, and the attachment 24 corresponding to the remote control signal RS. The posture change amount estimation unit 320B outputs expected posture change amount information EC for the calculated expected posture change amount to the overload detection unit 330.

Here, the actual posture change amount information AC and expected posture change amount information EC includes values of change amounts in the positions, the angles, and the like of the main body 21, the boom 22, the arm 23, and the attachment 24 of the excavator 20.

The overload detection unit 330 receives the actual posture change amount information AC from the posture change amount measurement unit 310B and receives the expected posture change amount information EC from the posture estimation unit 320B. The overload detection unit 330 detects whether or not the overload occurs based on the actual posture change amount information AC and the expected posture change amount information EC.

The overload detection unit 330 determines that the overload has not occurred when a difference between the actual posture change amount information AC and the expected posture change amount information EC is within the allowable range. Conversely, the overload detection unit 330 determines that overload has occurred when the difference between the actual posture change amount information AC and the expected posture change amount information EC exceeds the allowable range.

For example, when the difference between the actually measured change amount in the position of the arm 23 and the expected change amount in the position of the arm 23 exceeds the allowable value, the overload detection unit 330 determines that the overload has occurred in the excavator 20.

When it is determined that overload has occurred, the overload detection unit 330 outputs the drive stop signal SS to the drive unit 340.

The drive unit 340 drives the excavator 20 in response to the remote control signal RS. The drive unit 340 converts the remote control signal RS into a drive signal DS suitable for driving the excavator 20 and outputs the drive signal DS to the excavator 20.

The drive unit 340 blocks the drive signal DS in response to the drive stop signal SS received from the overload detection unit 330.

Figure 6:
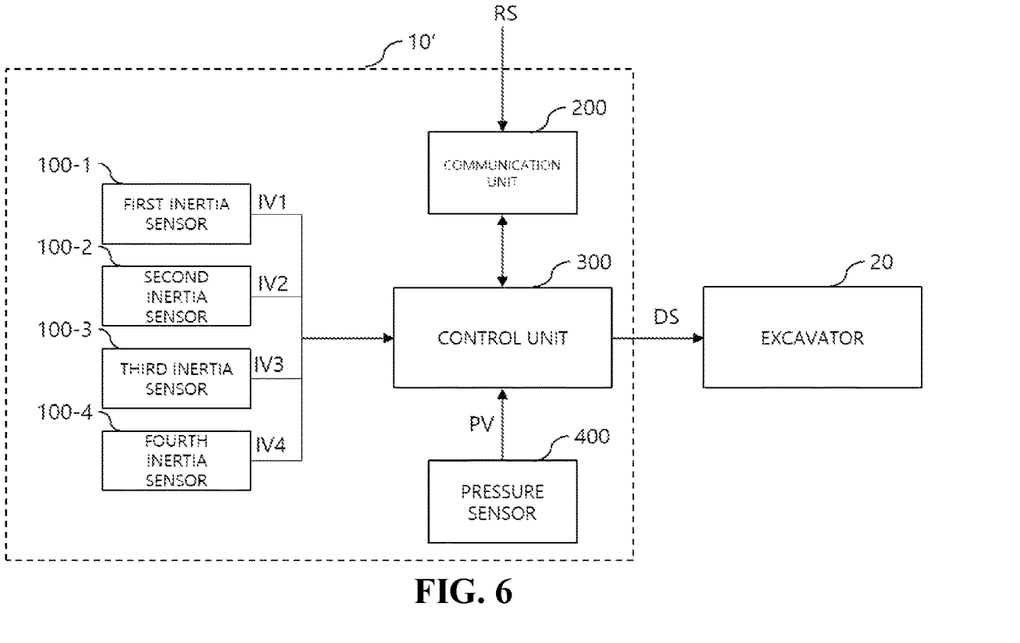
FIG. 6 is a block diagram illustrating an apparatus for controlling a remote-controlled excavator according to a second embodiment of the present invention.

FIG. 6 is a block diagram illustrating a control apparatus of a remote-controlled excavator according to a second embodiment of the present invention. A control apparatus 10' illustrated in FIG. 6 is the same as the control apparatus 10 illustrated in FIG. 2 except that a pressure sensor 400 is added, and thus overlapping descriptions will be omitted.

Referring to FIG. 6, the control apparatus 10' includes inertial sensors 100-1 to 100-4, a communication unit 200, a control unit 300, and the pressure sensor 400.

The pressure sensor 400 may be provided on an attachment 24 of the excavator 20. The pressure sensor 400 measures a pressure applied to the attachment 24, that is, a magnitude of a reaction force, and outputs a measured pressure sensing value PV to a control unit 300.

The control unit 300 may adjust an allowable range (or value) based on the pressure sensing value PV. That is, when the magnitude of the reaction force is large, the control unit 300 may reduce the case of overload by extending the allowable range.

For example, when the temperature of the working environment is very low and the ground is frozen, the control unit 300 expands the allowable range according to an increased reaction force so that the operation can be continued smoothly without stopping the excavator 20.

Although the present invention has been described with reference to embodiments illustrated in the drawings, the embodiments are merely exemplary, and those of ordinary skill in the art will understand that various modifications and equivalent other embodiments are possible therefrom. Accordingly, a true technical protection scope of the present invention should be determined by a technical spirit of appended claims.

REFERENCE SIGNS LIST

10, 10': control apparatus
20: remote-controlled excavator
100-1 to 100-4: inertial sensor
200: communication unit
300: control unit
400: pressure sensor

The invention claimed is:

1. A remote-controlled excavator, comprising:
   inertial sensors provided in an excavator;
   a communication unit configured to receive a remote control signal from a remote control device; and a control unit configured to drive the excavator in response to the remote control signal,
wherein the control unit stops driving of the excavator when a difference between an expected posture of the excavator estimated based on the remote control signal and an actual posture of the excavator measured using the inertial sensors exceeds an allowable value,
wherein the allowable value is determined by at least a work environment including temperature and humidity,
wherein the control unit includes:
a drive unit configured to output a drive signal to the excavator in response to the remote control signal;
a memory configured to store a current posture of the excavator;
a posture estimation unit configured to estimate the expected posture based on the current posture and a posture change value corresponding to the remote control signal;
a posture measurement unit configured to measure the actual posture based on sensing values; and
an overload detection unit configured to output a drive stop signal to the drive unit when the difference between the expected posture and the actual posture exceeds the allowable value,
wherein the drive unit blocks the drive signal in response to the drive stop signal,
wherein the remote-controlled excavator further comprises a pressure sensor provided in an attachment of the excavator,
wherein the pressure sensor measures a reaction force as a pressure applied to the attachment,
wherein the control unit adjusts the allowable value according to a magnitude of the reaction force measured by the pressure sensor, and
wherein the control unit reduces a case of overload by extending a range of the allowable value when the magnitude of the reaction force is larger than a preset value.

2. The remote-controlled excavator of claim 1, wherein the inertial sensors include:
a first inertial sensor provided in a main body of the excavator;
a second inertial sensor provided in a boom of the excavator;
a third inertial sensor provided in an arm of the excavator; and
a fourth inertial sensor provided in an attachment of the excavator.

3. The remote-controlled excavator of claim 2, wherein the attachment includes a bucket, a breaker, a vibrator, a fork, a crusher, or a grapple.

4. The remote-controlled excavator of claim 1, wherein, when the difference between the expected posture and the actual posture exceeds the allowable value, the communication unit transmits an overload occurrence signal to the remote control device.

5. A remote-controlled excavator, comprising:
inertial sensors provided in an excavator;
a communication unit configured to receive a remote control signal from a remote control device; and
a control unit configured to drive the excavator in response to the remote control signal,
wherein the control unit stops driving of the excavator when a difference between an expected posture of the excavator estimated based on the remote control signal and an actual posture of the excavator measured using the inertial sensors exceeds an allowable value,
wherein the control unit includes:
a drive unit configured to output a drive signal to the excavator in response to the remote control signal;
a posture change amount measurement unit configured to measure an actual posture change amount of the excavator based on sensing values received from the inertial sensors;
a posture change amount estimation unit configured to calculate an expected posture change amount corresponding to the remote control signal, wherein the posture change amount is determined by at least a work environment including temperature and humidity; and
an overload detection unit configured to output a drive stop signal to the drive unit when a difference between the actual posture change amount and the expected posture change amount exceeds the allowable value while the excavator is driven,
wherein the drive unit blocks the drive signal in response to the drive stop signal,
wherein the remote-controlled excavator further comprises a pressure sensor provided in an attachment of the excavator,
wherein the pressure sensor measures a reaction force as a pressure applied to the attachment,
wherein the control unit adjusts the allowable value according to a magnitude of the reaction force measured by the pressure sensor, and
wherein the control unit reduces a case of overload by extending a range of the allowable value when the magnitude of the reaction force is larger than a preset value.

6. The remote-controlled excavator of claim 1, wherein the communication unit transmits the actual posture of the excavator to the remote control device.

7. A method for controlling a remote-controlled excavator, comprising:
measuring a current posture of an excavator and storing the current posture in a memory as a current posture information;
calculating a posture change value corresponding to a control signal received from a remote control device, wherein the posture change value is determined by at least a work environment including temperature and humidity;
estimating an expected posture by adding the posture change value to the current posture information stored in the memory;
driving the excavator by outputting a drive signal to the excavator in response to the control signal and measuring an actual posture of the excavator based on sensing values received from inertial sensors provided in the excavator;
stopping driving of the excavator when a difference between the expected posture and the actual posture exceeds an allowable value by outputting a drive stop signal to the excavator;
measuring a reaction force as a pressure applied to an attachment of the excavator;
adjusting the allowable value according to a magnitude of the reaction force; and
reducing a case of overload by extending a range of the allowable value when the magnitude of the reaction force is larger than a preset value.

8. The method for controlling the remote-controlled excavator of claim 7, further comprising updating the current posture using the actual posture.

9. The method for controlling the remote-controlled excavator of claim 7, further comprising transmitting an overload signal to the remote control device when the difference between the expected posture and the actual posture exceeds the allowable value.

* * * * *